(12) United States Patent
Totani

(10) Patent No.: US 6,744,515 B1
(45) Date of Patent: Jun. 1, 2004

(54) HEAT SEAL POSITION MEASUREMENT DEVICE FOR PLASTIC FILM

(75) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 203 days.

(21) Appl. No.: 09/857,207

(22) PCT Filed: Oct. 24, 2000

(86) PCT No.: PCT/JP00/07437

§ 371 (c)(1),
(2), (4) Date: Oct. 16, 2001

(87) PCT Pub. No.: WO01/31291

PCT Pub. Date: May 3, 2001

(30) Foreign Application Priority Data

Oct. 25, 1999 (JP) ............................................ 11-302125
Dec. 28, 1999 (JP) ............................................ 11-374660
Sep. 21, 2000 (JP) ........................................ 2000-287344

(51) Int. Cl.[7] ........................ G01N 21/84; G01N 21/55
(52) U.S. Cl. ....................... 356/429; 356/430; 356/431; 356/445
(58) Field of Search .............................. 356/239.1, 429, 356/430, 431, 445; 493/22, 287

(56) References Cited

U.S. PATENT DOCUMENTS

| | | | | |
|---|---|---|---|---|
| 3,947,117 A | * | 3/1976 | Basu et al. .................... | 355/68 |
| 4,205,769 A | * | 6/1980 | Blitchington ................. | 226/24 |
| 4,500,307 A | * | 2/1985 | Bridgeman .................. | 493/196 |
| 5,136,906 A | * | 8/1992 | Antonissen et al. ........... | 83/42 |
| 5,695,106 A | * | 12/1997 | Bauknecht ..................... | 226/2 |
| 5,807,222 A | * | 9/1998 | Totani .......................... | 493/22 |
| 6,106,448 A | * | 8/2000 | Obara et al. .................. | 493/11 |

* cited by examiner

Primary Examiner—Rodney Fuller
(74) Attorney, Agent, or Firm—Westerman, Hattori, Daniels & Adrian, LLP

(57) ABSTRACT

An apparatus for detecting the heat-sealed interfaces of plastic film being fed into a machine includes a plurality of light sources opposed to a heat-sealed plastic film. The lights are spaced from each other in directions parallel and perpendicular to the direction in which the plastic film is fed. An optical sensor is opposed to the plastic film, and a cover plate is placed between the optical sensor and the plastic film, the cover plate including small hole or narrow slit through which light passes. The lights reflect from or permeate through the plastic film and then pass to the optical sensor. The optical sensor image-recognizes the reflected or permeated lights and reads the minutely rugged surface of the heat sealed portion to detect the heat sealed interface of the plastic film.

16 Claims, 8 Drawing Sheets

HEAT SEAL POSITION MEASUREMENT DEVICE FOR PLASTIC FILM

TECHNICAL FIELD

The invention relates to an apparatus for detecting heat sealed places of plastic film means.

BACKGROUND

For example, in a machine for successively making plastic bags, it is frequent practice to make plastic film means include heat sealed portions each of which has a surface minutely rugged to constitute a pattern such as a mesh. The plastic film means is then fed longitudinally thereof and intermittently, and cut along a line predetermined at or near the heat sealed portion by a cutler. In this case, it is required to cut the plastic film means precisely along a line predetermined at or near the heat sealed portion thereof. Accordingly, it is desirable to detect the heat sealed place of plastic film means whenever the plastic film means is fed longitudinally thereof and intermittently. Under the circumstances, the applicant proposed a new type of apparatus for detecting the heat sealed places of plastic film means, before this application, as disclosed in Japanese Laid-Open Patent Publication No. 190,608 of 1999.

In the apparatus of the publication, a light source and an optical sensor are opposed to the plastic film means so that the light source emits light which reflects from or permeates through the plastic film means to be directed tea the optical sensor. The reflecting or permeating light is deflected by the minutely rugged surface of heat sealed portion to change the amount of light received by the optical sensor, when the heat sealed portion reaches a position at which the apparatus is disposed. As a result, there would appear a wave-shaped difference in amount of light received by the optical sensor in a direction perpendicular to the direction in which the plastic film means is fed. The optical sensor then reads out the minutely rugged surface of heat sealed portion from the wave of difference to detect the heat sealed place of the plastic film means. However, to tell the truth, the apparatus is uncertain to detect the heat sealed place to be problematic in reliability. This is considered as a matter due to the relation between the minutely rugged surface and the amount of light received by the optical sensor. Though the reflecting or permeating light is sure to be deflected by the minutely rugged surface, the deflected conditions are very complicated. It is therefore considered that the wave-shaped difference is not always brought into existence in amount of light received by the optical sensor, even if the reflecting or permeating light is deflected. In such the case, the apparatus can not read out the minutely rugged surface of heat sealed portion from the wave of difference to detect the heat sealed place of plastic film means.

It is therefore an object of the invention to reliably detect the heat sealed places of plastic film.

DISCLOSURE OF THE INVENTION

According to the invention, there is provided an apparatus for detecting heat sealed places of plastic film means which is fed in a direction. The plastic film means includes heat sealed portions formed at the heat sealed places. Each of the heat sealed portions has a surface minutely rugged to constitute a pattern such as a mesh. In addition, light source means and an optical sensor are opposed to the plastic film means. A cover plate is disposed between the optical sensor and the plastic film means. The cover plate includes small hole or narrow slit means through which light passes. The light source means emits light which reflects from or permeates through the plastic film means to be directed to tie optical sensor. The optical sensor image recognizes the reflecting or permeating light and reads out the minutely rugged surface of heat sealed portion to detect the heat sealed place of plastic film means in accordance with a variation of image.

It is preferable that the light source means comprises a plurality of light sources spaced from each other and opposed to the plastic film means.

It is also preferable that the light sources are spaced from each other in directions parallel and perpendicular to the direction in which the plastic film means is fed.

In addition, it is preferable that the small hole or narrow slit means comprises a plurality of small holes or narrow slits formed in the cover plate to be spaced from each other.

Furthermore, it is preferable that the small holes or narrow slits are spaced from each other in directions parallel and perpendicular to the direction in which the plastic film means is fed.

In a preferred embodiment, the plastic film means is fed longitudinally thereof and intermittently. In addition, the plastic film means is heat sealed widthwise thereof whenever intermittently fed. The optical sensor then detects the heat sealed place of plastic film means whenever the plastic film means is intermittently fed. A cutter is disposed at a position and moved by position adjustment means to adjust the position of edge of cutter in a direction parallel to the direction in which the plastic film means is fed, in response to a detecting signal transmitted from the optical sensor so that the plastic film means can be cut along a line predetermined at or near the heat sealed portion thereof by the cutter.

The plastic film may be heat sealed widthwise thereof by seal bar means disposed at a position. The optical sensor then detects the heat sealed place of plastic film means whenever the plastic film means is intermittently fed, to adjust the feed length of plastic film means or the position of heat seal bar means in response to a detecting signal transmitted from the optical sensor so that the plastic film means can be cut the line predetermined at or near tile heat sealed portion thereof by a cutter.

In other embodiment, standing pouches are made from the plastic film means. Each of the standing pouches comprises rectangular panel materials which are superposed into two layers to have bottom and opposite side edges. A bottom material is folded into halves, superposed into two layers and interposed between the layers of panel material at the bottom edges thereof. One of the layers of panel material is bottom sealed with one of the layers of bottom material to include a bottom sealed portion formed along the bottom edge of panel material. The other layer of panel material is bottom sealed with the other layer of bottom material to include a bottom sealed portion formed along the bottom edge of panel material. The layers of panel material are cross sealed with each other to include cross sealed portions formed along the opposite side edges of panel material. Each of the bottom and cross sealed portions has the minutely rugged surface. The optical sensor reads out the minutely rugged surfaces of bottom and cross sealed portions to judge whether the relation in place between the bottom and cross sealed portions is good or no good, whenever the panel and bottom materials are fed widthwise of the standing pouches and intermittently after being bottom and cross sealed in a standing pouch making process.

It is preferable that each of the bottom sealed portions includes unsealed portions formed therein. Each of the unsealed portions has a surface which is not or barely minutely rugged. In the case, the optical sensor can judge whether the relation in place between the bottom and cross sealed portions is good or no good, in accordance with the place of unsealed portion.

It is preferable that each of the bottom sealed portions has a bowl-shaped upper edge. In the case, the optical sensor can judge whether the relation in place between the bottom and cross sealed portions is good or no good, in accordance with the place of bowl-shaped upper edge.

It is preferable that punch holes are formed in the bottom material at intersections between the bottom and cross sealed portions. The layers of panel material are partially sealed with each other at the places of punch holes. The punch holes protrude from the cross sealed portions to have protruding portions formed on the opposite sides of the cross sealed portions. Each of the protruding portions has a surface which is not or barely minutely rugged. In the case, the optical sensor can judge whether the relation in place between the punch holes and the bottom and cross sealed portions is good or no good, in accordance with the place of protruding portion.

It is preferable that the cross sealed portions have center lines along which notches are formed into the cross sealed portions from the bottom edges of panel material. In the case, the optical sensor can judge whether the relation in place between the notches and the bottom and cross sealed portions is good or no good.

In other embodiment, the optical sensor reads out the minutely rugged surfaces of bottoms and cross sealed portions to judge whether the relation in place between the bottom and cross sealed portions is good or no good, when the standing pouches are fed widthwise thereof after being made.

In the embodiment, each of the bottom sealed portions may include an unsealed portion formed therein. In the case, the optical sensor can judge whether the relation in place between the bottom and cross sealed portions is good or no good, in accordance with the place of unsealed portion.

Each of the bottom sealed portions may have a bowl-shaped upper edge. In the case, the optical sensor can judge whether the relation in place between the bottom and cross sealed portions is good or no good, in accordance with the place of bowl-shaped upper edge.

Punch holes slay be formed in the bottom material at intersections between the bottom and cross sealed portions. The punch holes may protrude from the cross sealed portions to have protruding portions formed on the opposite sides of the cross sealed portions. In the case, the optical sensor can judge whether the relation in place between the punch holes and the bottom and cross sealed portions is good or no good, in accordance with the place of protruding portion.

It is preferable that each of tile standing pouches are corner cut at corners between the bottom and opposite side edges thereof to give an appearance. In the case, the optical sensor can judge whether the appearance of corner cutting is good or no good.

In other embodiment, the optical sensor reads out the minutely rugged surfaces of cross sealed portions to judge whether the sealed width of cross sealed portion is good or no good, when the standing pouches are fed widthwise thereof after being made.

THE BEST MODE TO BE CARRY OUT THE INVENTION

Figure 1:
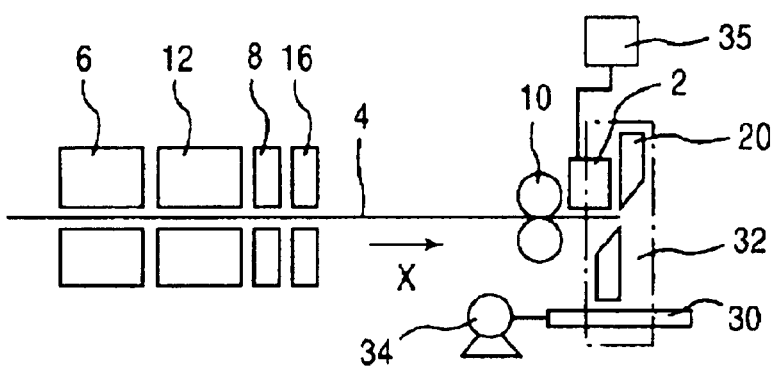
FIG. 1 is a side view of a preferred embodiment of the invention.
Figure 2:
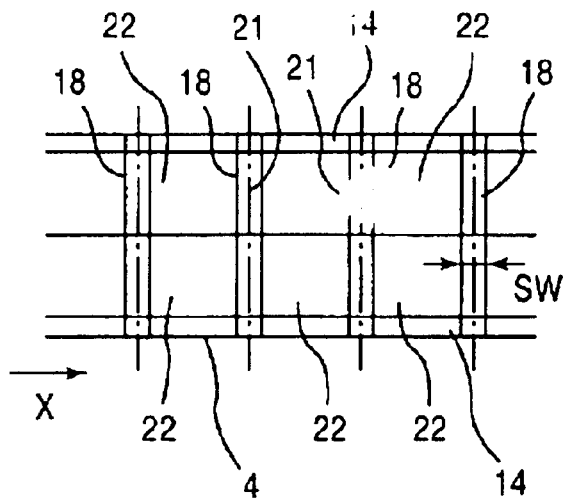
FIG. 2 is a plan view of the plastic film means of FIG. 1.

Referring now to the drawings, FIG. 1 illustrates an apparatus 2 for detecting heat sealed places according to the invention. The apparatus 2 is intended to detect heat sealed places of plastic film means 4 which is fed in a direction X. In the embodiment, the apparatus 2 is incorporated into a machine for successively making plastic bags. The plastic film means 4 comprises plastic films superposed into two layers. The plastic films 4 pass through longitudinal seal bars 6 and cross seal bars 8 to be directed between a pair of feed rollers 10 which are rotated by a drive motor so that the plastic films 4 can be fed longitudinally X thereof and intermittently. The longitudinal seal bars 6 and cooling bars 12 are operated by a drive motor so that the plastic films 4 can be heat sealed longitudinally X thereof and cooled by the cooling bars 12, whenever intermittently fed, to include heat sealed portions 14 formed therein, as shown in FIG. 2. The cross seal bars 8 and cooling bars 16 are operated by the drive motor so that the plastic film 4 can be heat sealed widthwise thereof arid cooled by the cooling bars 16, whenever intermittently fed, to include heat sealed portions 18 formed at the heat sealed places. A cutter 20 is then operated by the drive motor so that the plastic films 4 can be cut along a line predetermined at or near the heat sealed portion 18 by the cutter 20, whenever intermittently fed. In the embodiment, the plastic films 4 are cut along the center line 21 of heat sealed portion 18, to thereby successively make plastic bags 22. As to the heat sealed portion 18, the cross seal bars 8 or the cooling bars 16 include Teflon sheets or minutely rugged surfaces which are pressed against the heat sealed portions 18 to make each of the heat sealed portions 18 have a surface minutely rugged to constitute a pattern such as a mesh.

Figure 3:
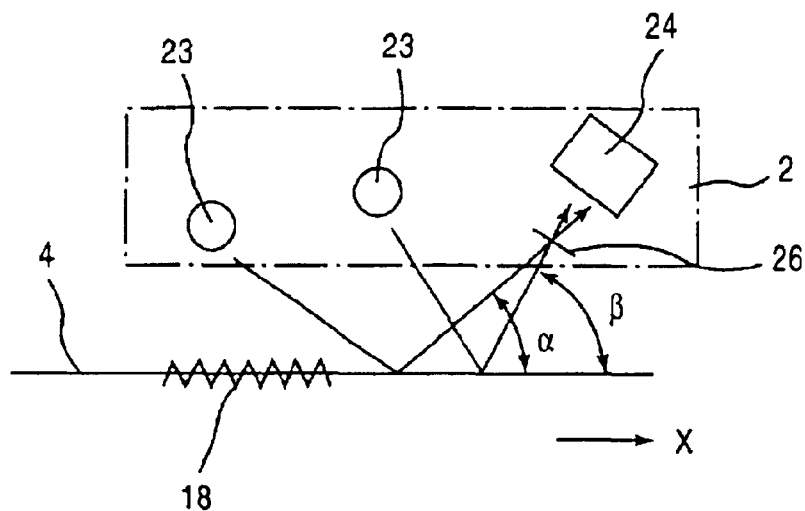
FIG. 3 is a side view of the apparatus for detecting the heat sealed place of FIG. 1.
Figure 4:
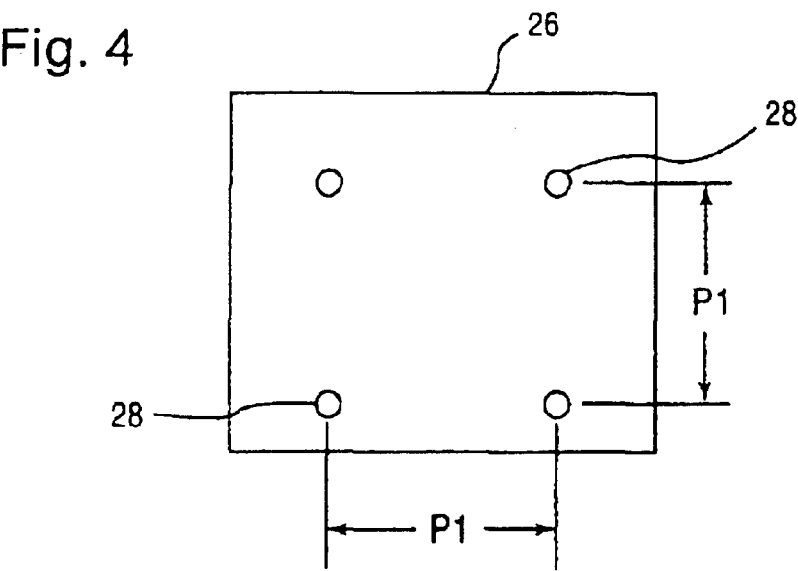
FIG. 4 is a bottom view of the cover plate of FIG. 3.

The apparatus 2 includes light source means 23, an optical sensor 24 and a cover plate 26, as shown in FIG. 3. The light source means 23 and the optical sensor 24 are opposed to the plastic films 4 on the upper side of the plastic films 4 at a position downstream of the cross seal bars 8 and the cooling bars 16 and upstream of the cutter 20. The cover plate 26 is disposed between the optical sensor 24 and the plastic films 4. The optical sensor 24 comprises a CCD camera. The cover plate 26 includes small hole means 28 through which light passes, as shown in FIG. 4. Accordingly, the light source means 23 emits light which reflects from the plastic films 4 and then passes through the small hole means 28 to be directed to the optical sensor 24 so that the optical sensor 24 can image recognize the reflecting light.

The light source means 23 comprises a plurality of light sources spaced from each other and opposed to the plastic films 4 to emit a plurality of lights which reflect from the plastic film 4 at angles different from each other and then passes through the small hole means 28 to be directed to the optical sensor 24 so that the optical sensor 24 can image recognize them. For example, two light sources 23 are spaced from each other in a direction parallel to the direction in which the plastic films 4 are fed. The lights therefore reflect from the plastic films 4 at angles $\alpha$ and $\beta$ different from each other and then passed through the small hole means 28 to be directed to the optical sensor 24 so that the optical sensor 24 can image recognize them.

Figure 5:
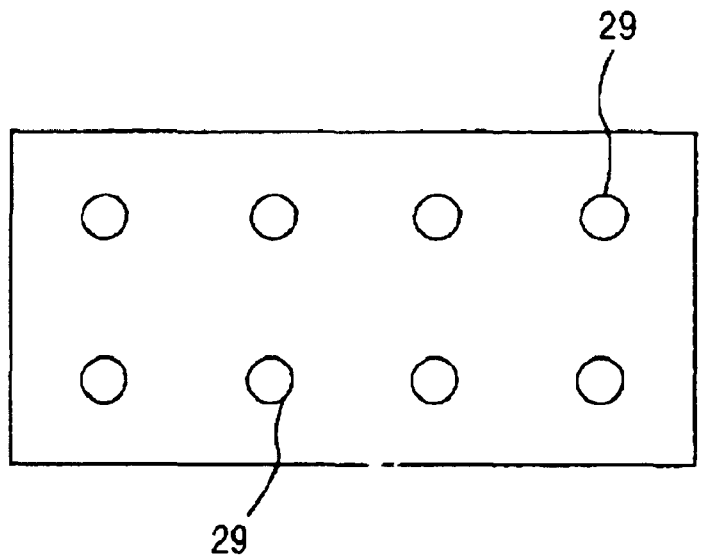
FIG. 5 is an explanatory view of images obtained by the optical sensor of FIG. 3.

In addition, the small hole means comprises a plurality of small holes 28 formed in the cover plate 26 to be spaced from each other. For example, four small holes 28 are formed in the cover plate 26 and spaced from each other in directions parallel and perpendicular to the direction in which the plastic films 4 are fed, to be arranged squarely at a pitch P1 of 5 to 20 mm. Each of the small holes 28 comprises a circular hole having a diameter of 0.1 to 5.0 mm. Accordingly, the reflecting lights pass through four small holes 28 to be directed to the optical sensor 24. The optical sensor 24 can therefore image recognize two reflecting lights 29 per small hole 28, or eight reflecting lights 29 in total, as shown in FIG. 5.

Figure 6:
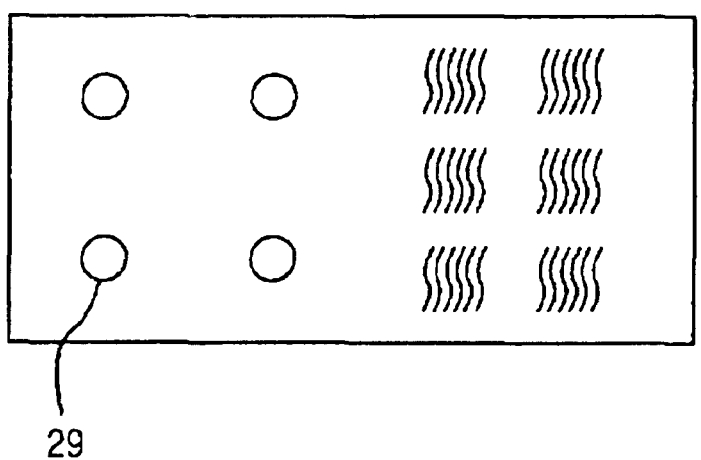
FIG. 6 is an explanatory view showing the disturbed images of reflecting lights of FIG. 5.

Furthermore, the reflecting lights are deflected by the minutely rugged surface of heat sealed portion 18 when the plastic films 4 are fed longitudinally X thereof and the heat sealed portion 18 reaches the position at which the apparatus 2 is disposed. Accordingly, the reflecting lights then pass thorough the small holes 28 of cover plate 26 to be directed to the optical sensor 24 so that the images of reflecting lights 29 are remarkably disturbed and changed, as shown in FIG. 6. The detector 24 can therefore read out the minutely rugged surface of heat sealed portion 18 to detect the heat sealed place of plastic films 4 in accordance with a variation of image. In addition, the optical sensor 24 can image recognize eight reflecting lights 29 in total, as described above, to read out the minutely rugged surface of heat sealed portion 18 by any one of the images of reflecting lights 29 remarkably disturbed and changed. The apparatus can therefore reliably detect the heat sealed places of plastic films 4 without difficulty.

In the embodiment, the optical sensor 24 is spaced from the plastic films 4 at a distance of 200 mm in view of the diameter of 0.1 to 5.0 mm of each of the small holes 28. When increasing the distance between the optical sensor 24 and the plastic films 4, it is preferable to increase the diameters of the small holes 28 in proportion to that distance.

Furthermore, in the embodiment, the plastic films 4 are heat sealed widthwise thereof whenever intermittently fed, as described above. The optical sensor 24 then detects the heat sealed place of plastic films 4 whenever the plastic films 4 are intermittently fed. In addition, the cutter 20 is disposed at a position and moved by position adjustment means to adjust the position of edge of cutter 20 in a direction parallel to the direction in which the plastic films 4 are fed, in response to a detecting signal transmitted from the optical sensor 24. The position adjustment means comprises a ball screw 30 threaded engaged with a frame 32 and connected to a drive motor 34, the cutter 20 being supported on the frame 32. The apparatus 2 is connected to a control device 35 which is connected to the drive motor 34. The ball screw 30 is therefore rotated by the drive motor 34 driven by the control device 35 so that the cutter 20 and the frame 32 can be moved in a direction parallel to the direction X in which the plastic films 4 are fed, to adjust the position of edge of cutter 20 in response to a detecting signal transmitted from the detector 24 detecting the heat sealed place, whenever the plastic film 4 are intermittently fed after heat sealed. Accordingly, the plastic films 4 can then be cut along the line predetermined at or near the heat sealed portion 18 by the cutter 20.

The apparatus can therefore cut the plastic films 4 precisely along the center line 21 of heat sealed portion 18. As a result, the apparatus can diminish the sealed width SW of heat sealed portion 18 and therefore lower the material cost of plastic films 4. It has been heretofore to select the sealed width SW of heat sealed portion 18 to be about 10 mm by reason of a difficulty in cutting the plastic films 4 precisely along the center line 21 of heat sealed portion 18. In contrast, the apparatus can diminish the sealed width SW of heat sealed portion 18 to be about 5 mm and cut the plastic films 4 precisely along the center line 21 thereof.

The apparatus may be arranged to adjust the feed length of plastic films 4 in response to the detecting signal transmitted from the optical sensor 24 so that the plastic films 4 can be cut along the line predetermined at or near the heat sealed portion 18 thereof by the cutter 20. It may be arranged to adjust the position of cross seal bars 8 and cooling bars 16 in response to the detecting signal transmitted from the optical sensor 24 so that the plastic films 4 can be cut along the line predetermined at or near the heat sealed portion 18 thereof by the cutter 20.

Figure 7:
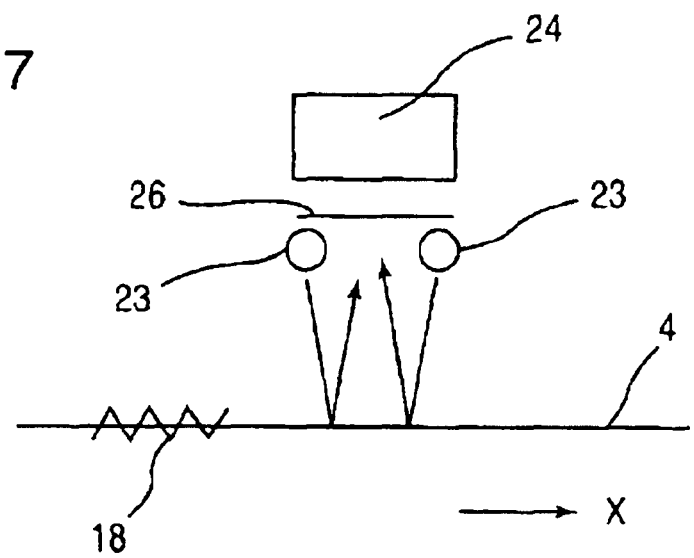
FIG. 7 is a side view of other embodiment.
Figure 8:
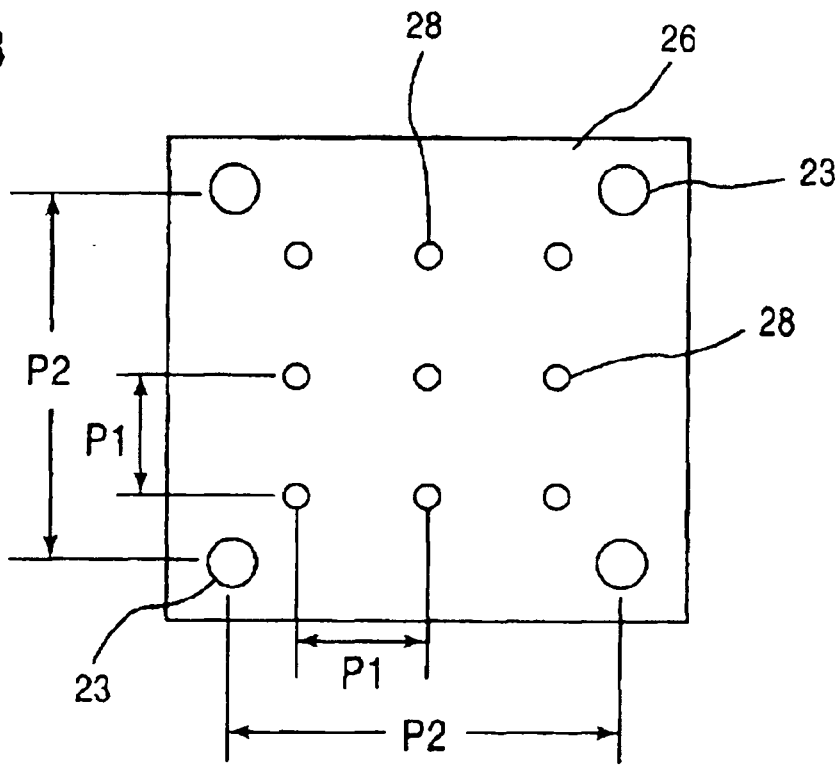
FIG. 8 is a bottom view of the cover plate of FIG. 7.

FIG. 7 and FIG. 8 illustrate other embodiment in which nine small holes 28 are formed in the cover plate 26 and spaced from each other in directions parallel and perpendicular to the direction X in which the plastic films 4 are fed, to be latticed in three lines at a pitch P1 of 5 to 20 mm. In addition, four light sources 23 are spaced from each other in directions parallel and perpendicular to the direction X in which the plastic films 4 are fed, to be arranged squarely at a pitch P2 which is three times as large as the pitch P1 or small holes 28.

P2=3×P1

In this case, the light sources 23 emit lights which reflect from the plastic films 4 at angles different from each other in directions parallel and perpendicular to the direction X in which the plastic film 4 are fed, and then pass through the small holes 28 to be directed to the optical sensor 24. The optical sensors 24 can therefore image recognize four reflecting lights per small hole 28, or 36 reflecting lights in total.

In the embodiment in which the light sources 23 are spaced from each other in directions parallel and perpendicular to the direction X in which the plastic films 4 are fed, to be arranged squarely, it should therefore be noted that the number of light sources 23 doubles the number of reflecting lights which the optical sensors 24 can image recognize, to reliably read out the minutely rugged surface of heat sealed portion 18 without difficulty. In the embodiment in which the small holes 28 are spaced from each other in directions parallel and perpendicular to the direction X in which the plastic films 4 are fed, to be latticed, it should also be noted that the number of small holes 28 doubles the number of reflecting lights which the optical sensors 24 can image recognize, to reliably read out the minutely rugged surface of heat sealed portion 18 without difficulty. Accordingly, the apparatus can reliably detect the heat sealed places of plastic films 4 without difficulty.

In the embodiment of FIG. 7, the lights reflect from the plastic films 4 and pass through the small holes 28 of cover plate 26 to be directed to the optical sensor 24 in a direction nearly vertical to the plastic films 4. The images of reflecting lights are therefore preferably kept from being disturbed regardless of a certain fluctuation in height of plastic films 4.

The cover plate 26 may include not the small hole means 28 but narrow slit means formed therein so that light reflects the plastic films 4 and passes through the narrow slit means to be directed to the optical sensor 24. The optical sensor 24 should image recognize the reflecting light and read out the minutely rugged surface of heat sealed portion 18 to detect the heat sealed Place of plastic films 4.

The light sources 23 and the optical sensor 24 may be opposed to the plastic films 4 not on the upper side but on the lower side of the plastic films 4. The cover plate 26 should be disposed between the optical sensor 24 and the plastic films 4. The lights therefore reflect from the plastic films 4 and pass through the small hole or narrow slit means 28 to be directed to the optical sensor 24 so as to read out the minutely rugged surface of heat sealed portion 18 and detect the heat sealed place of plastic films 4.

Figure 9:
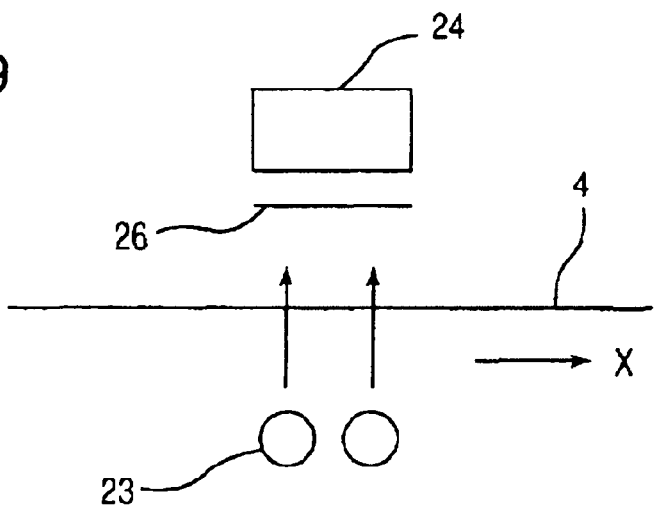
FIG. 9 is a side view of other embodiment.

In other embodiment of FIG. 9, the light sources 23 are opposed to the plastic films 4 on one of the opposite sides of the plastic films 4 while the optical sensor 24 is opposed to the plastic films 4 on the other side of the plastic films 4. The cover plate 26 is disposed between the optical sensor 24 and the plastic films 4. The light sources 23 emit the lights which permeate through the plastic films 4 and pass through the small hole or narrow slit means 28 to be directed the optical sensor 24. The optical sensor 24 image recognizes the permeating lights and reads out the minutely rugged surface of heat sealed portion 18 to detect the heat sealed place of plastic film means 4.

Figure 10:
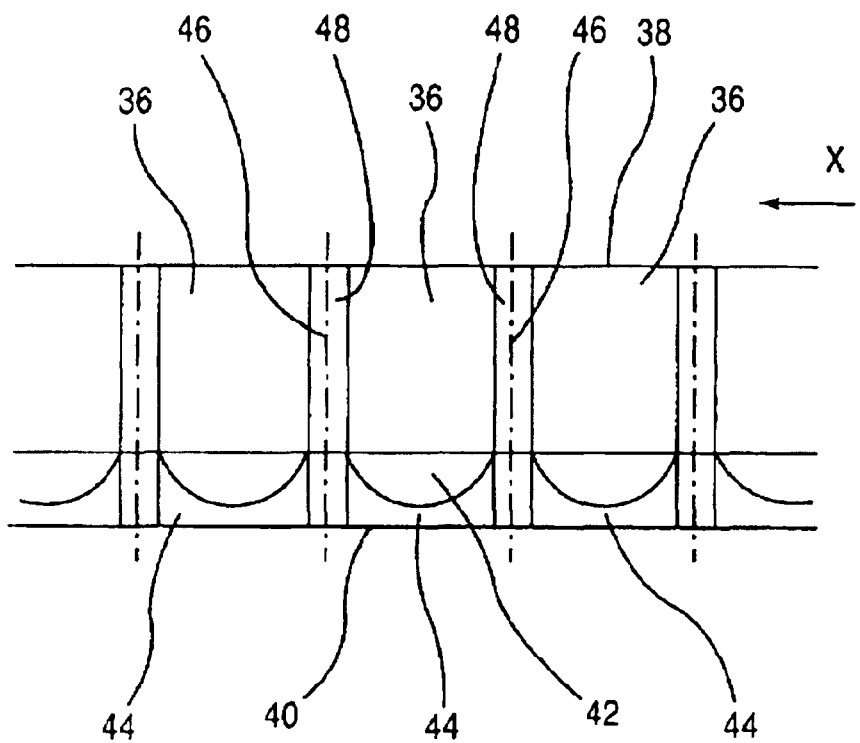
FIG. 10 is a plan view of other embodiment.

FIG. 10 illustrates other embodiment in which standings pouches 36 are made from the plastic films 4. Each of standing pouches 36 includes rectangular panel materials 38 which are superposed into two layers to have bottom edges 40 aligned with each other. A bottom material 42 is folded into halves, superposed into two layers and interposed between the layers of panel material 38 at the bottom edges 40 thereof. One of the layers of panel material 38 is bottom sealed with one of the layers of bottom material 42 to include a bottom sealed portion 44 formed along the bottom edge 40 of panel material 38. The other layer of panel material 38 is bottom sealed with the other layer of bottom material 42 to include a bottom sealed portion 44 formed along the bottom edge 40 of panel material 38. In addition, the layers of panel material 38 are cross sealed with each other to include cross sealed portions 48 formed along the opposite side edges 46 of panel material 38. The panel and bottom materials 38 and 42 comprise the plastic films 4. Each of the bottom and cross sealed portions 44 and 48 has the minutely rugged surface.

In a process of making the standing pouches 36, the panel and bottom materials 38 and 42 are bottom sealed by bottom seal bars and cooled by cooling bars. In addition, the panel and bottom materials 38 and 42 are cross sealed by cross sealed bars and cooled by cooling bars. The panel and bottom materials 38 and 42 are then fed widthwise X of the standing pouches 36. Furthermore, the panel and bottom materials 38 and 42 are cut along the center line of the cross sealed portion 48 so that the opposite side edges 46 can be formed. The bottom and cross seal bars or the cooling bars include Teflon sheets or minutely rugged surfaces which are pressed against the panel materials 38 when bottom and cross sealed or cooled, to make each of the bottom and cross sealed portions 44 and 48 have the minutely rugged surface.

In this case, the panel and bottom materials 38 and 42 are not always precisely bottom and cross sealed. The relation in place between the bottom and cross sealed portions 44 and 48 is therefore not always good. Under the circumstances, in the embodiment, the apparatus 2 is arranged similarly to the above embodiments to include the light sources 23, the optical sensor 24 and the cover plate 26 disposed on the upper or lower side of the panel and bottom materials 38 and 42 when the panel and bottom materials 38 and 42 are fed widthwise X of the standing pouches 36 and intermittently after being bottom and cross sealed in the standing pouch making process. The optical sensor 24 can therefore read out the minutely rugged surface of bottom and cross sealed portions 44 and 48 to judge whether the relation in place between the bottom and cross sealed portions 44 and 48 is good or no good. A proper measure can therefore be taken when the panel and bottom materials 38 and 42 are not precisely bottom and cross sealed. For example, a device may be arranged to generate an alarm sound or light or discharge the panel and bottom materials 38 and 42.

In this connection, the cross sealed portion 48 are formed along the opposite side edges 46 to extend in a direction perpendicular to the direction X in which the panel and bottom materials 38 and 42 are fed widthwise of the standing pouches 36. In addition, unlike the cross sealed portion 48 of standing pouch 36, the non-sealed portion has a surface which is not minutely rugged so that the images of reflecting lights are not disturbed and changed when the lights reflect from the non-sealed portion and pass through the small holes 28 of cover plate 26 to be directed to the optical sensor 24. In contrast, as to the cross sealed portion 48, the images of reflecting lights are remarkably disturbed and changed when the lights reflect from the cross sealed portion 48 and pass through the small holes 28 of cover plate 26 to be directed to the optical sensor 24. The optical sensor 24 can therefore detect the cross sealed portion 48 or the cross sealed place.

Figure 11:
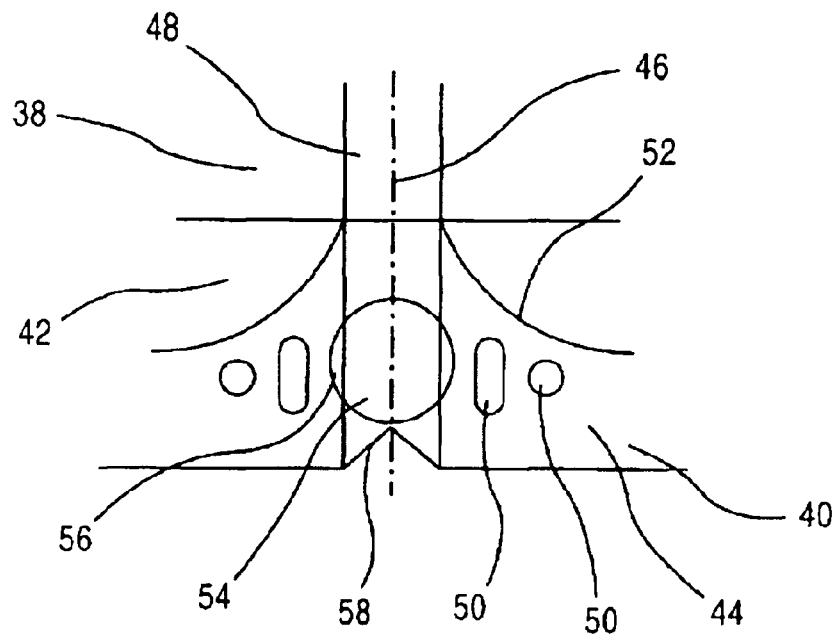
FIG. 11 is an enlarged view of the panel and bottom materials of FIG. 10.

On the other hand, the bottom sealed portions 44 are formed along the bottom edges 40 of panel material 38 to extend in a direction parallel to the direction in which the panel and bottom materials 38 and 42 are fed. However, in general, each of the bottom sealed portions 44 includes unsealed portions 50 formed therein, as shown in FIG. 11. Each of the unsealed portions 50 has a surface which is not or barely minutely rugged. The term "barely minutely rugged" means here to be at least less minutely rugged than tie bottom and cross sealed portions 44 and 48. In this case, the images of reflecting lights are remarkably disturbed and changed when the lights reflect from the bottom sealed portion 44 and pass through the small holes 28 of cover plate 26 to be directed to the optical sensor 24. In contrast, the images of reflecting lights are not disturbed and changed when the lights reflect from the unsealed portion 50 and pass through the small holes 28 of cover plate 26 to be directed to the optical sensor 24. The optical sensor 24 can therefore detect the bottom sealed portion 44 or the bottom sealed place and judge whether the relation in place between the bottom and cross sealed portions 44 and 45 is good or no good, in accordance with the place of unsealed portion 50.

In the case of standing pouch 36, each of the bottom sealed portions 44 has a bowl-shaped upper edge 52 which extends obliquely to the direction in which the panel and bottom materials 38 and 42 are fed. The optical sensor 24 can therefore detect the place of bowl-shaped upper edge 52 and judge whether the relation in place between the bottom and cross sealed portions 44 and 48 is good or no good, in accordance with the place of bowl-shaped upper edge 52.

Furthermore, punch holes 54 are formed in the bottom material 42 at intersections between the bottom and cross sealed portions 44 and 48. The layers of panel material 38 are partially sealed with each other at the places of punch holes 54. The punch holes 54 protrude from the cross sealed portions 48 to have protruding portions 56 formed on the opposite sides of the cross sealed portions 48. Each of the protruding portions 56 has a surface which is not or barely minutely rugged. The term "barely minutely rugged" means here to be at least less minutely rugged than the bottom and cross sealed portions 44 and 48. The optical sensor 24 can therefore detect the place of protruding portion 56 and judge whether the relation in place between the punch holes 54 and the bottom and cross sealed portions 44 and 48 is good or no good, in accordance with the place of protruding portion 56.

It is also usual that the cross sealed portions 48 have center lines along which notches 58 are formed into the cross sealed portions 48 from the bottom edges 40 of panel material 38. The notches 58 are intended to make the standing pouches 36 corner cut. The standing pouches 36 are corner cut at corners between the bottom and opposite side edges 40 and 46 when the panel and bottom materials 38 and 42 are cut along the center lines of cross sealed portions 48. In this case, the optical sensor 24 can detect the places of notches 58 and judge whether the relation in place between the notches 58 and the bottom and cross sealed portions 44 and 48 is good or no good.

Figure 12:
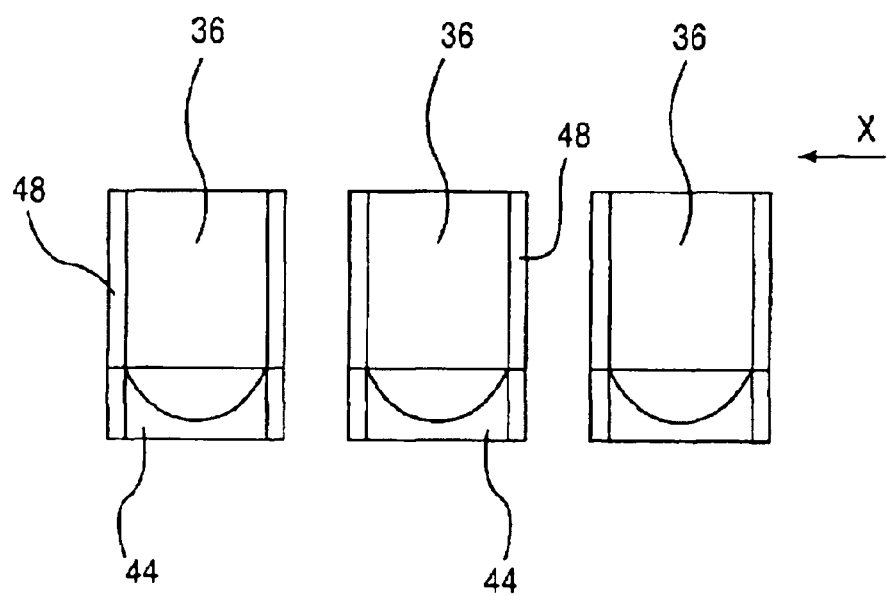
FIG. 12 is a plan view of other embodiment.

The apparatus may be arranged that the optical sensor 24 reads out the minutely rugged surfaces of bottom and cross sealed portions 44 and 48 when the standing pouches 36 are fed widthwise X thereof after being made, as shown in FIG. 12. The optical sensor 24 can therefore judge whether the relation in place between the bottom and cross sealed portion is good or no good, as in the case of the embodiment of FIG. 10.

In the embodiment of FIG. 12, the apparatus may be arranged that the optical sensor 24 judges whether the relation in place between the bottom and cross sealed portions 44 and 48 is good or no good, in accordance with the place of unsealed portion 50. The apparatus may also be arranged that the optical sensor 24 judges whether the relation in place between the punch holes 54 and the bottom and cross sealed portions 44 and 48 is good or no good, in accordance with the place of protruding portion 56. In the case of each of standing pouches 36 corner cut at corners between the bottom and opposite side edges 40 and 46 thereof to give an appearance, the apparatus may be arranged that the optical sensor 24 judges whether the appearance of corner cutting is good or no good.

In addition, the apparatus may be arranged that the optical sensor 24 reads out the minutely rugged surfaces of cross sealed portions 48 to judge whether the sealed width of cross sealed portion 48 is good or no good, when the standing pouches 36 are fed widthwise X thereof after being made.

In the case of a plurality of light sources 23 opposed to the plastic films 4, a plurality of small holes 28 have not always to be formed in the cover plate 26. Even with a single small holes 28, the number of light sources 23 doubles the number of reflecting lights which the optical sensor 24 can image recognize, to read out the minutely rugged surface of heat sealed portion 18 in accordance with the variation of image.

By contraries, in the case of a plurality of small holes 28 formed in the cover plate 26, a plurality of light sources 23 have not always to be opposed to the plastic films 4. Even with a single light source 23, it emits light which reflects from or permeates through the plastic films 4 and passes through the small holes 28 to be directed to the optical sensor 24, as shown in FIG. 13, so that the number of small holes 28 doubles the number of reflecting or permeating lights which the optical sensor 24 can image recognize, to read out the minutely rugged surface of heat sealed portion 18 in accordance with the variation of image.

Figure 13:
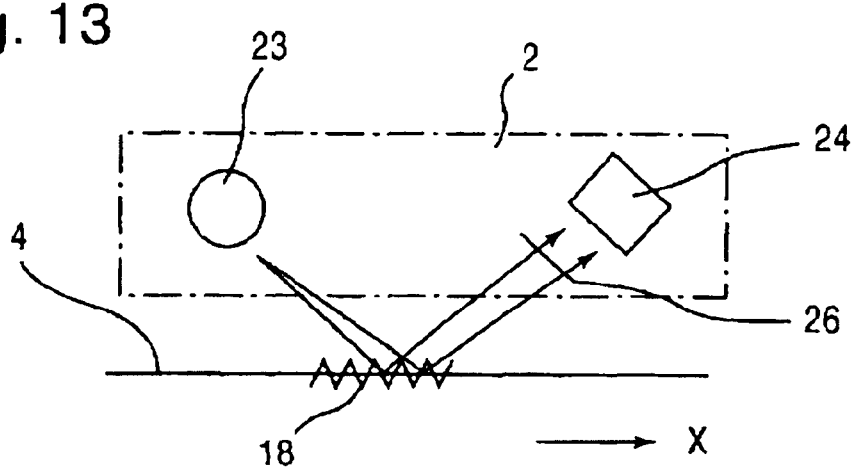
FIG. 13 is a side view of other embodiment.
Figure 14:
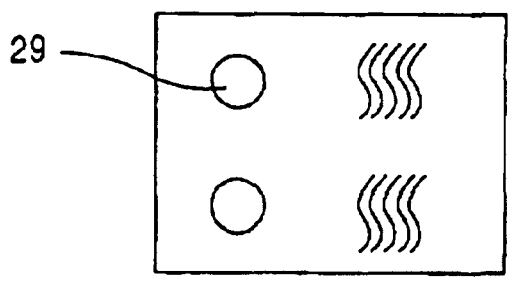
FIG. 14 is an explanatory view of images obtained by the optical sensor of FIG. 13.

In the embodiment of FIG. 13, the apparatus includes the same cover plate 26 as that of FIG. 4 in which four small holes 28 are spaced from each other in directions parallel and perpendicular to the direction X in which the plastic films 4 are fed. The apparatus can therefore image recognize four reflecting or permeating lights in total. In addition, the images of reflecting or permeating lights are remarkably disturbed and changed, as shown in FIG. 14, when the light reflects from or permeates through the minutely rugged surface of heat sealed portion 18 and passes through the small holes 28 of cover plate 26 to be directed to the optical sensor 24. The apparatus can therefore read out the minutely rugged surface of heat sealed portion 18 to detect the heat sealed place of plastic films 4.

In the case of narrow slit means formed in the cover plate 26, even with a single light source 23, it emits light which reflects from or permeates through the plastic films 4 and passes through the narrow slit means of cover plate 26 to be directed to the optical sensor 24 so that the optical sensor 24 can image recognize the reflecting or permeating light and read out the minutely rugged surface of heat sealed portion 18 to detect the heat sealed place of plastic films 4 in accordance with a variation of image. In the case, it is preferable that the narrow slit means extends in a direction parallel to the direction X in which the plastic films 4 are fed.

Figure 15:
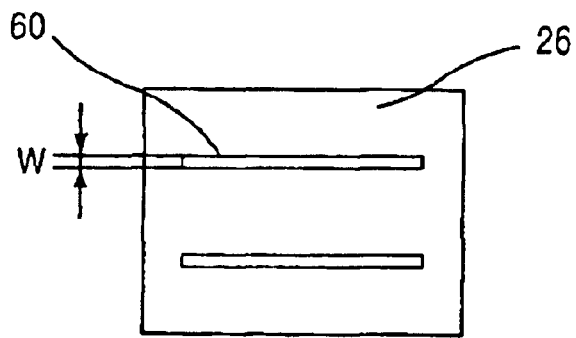
FIG. 15 is a bottom view of other embodiment.
Figure 16:
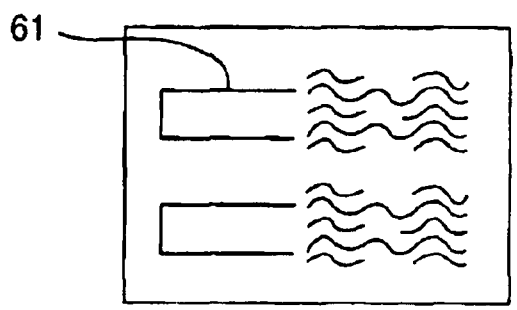
FIG. 16 is an explanatory view of images of the embodiment of FIG. 15.

In other embodiment of FIG. 15, the narrow slit means comprises a plurality of narrow slits 60 formed in the cover plate 26, having a width W and extending in a direction parallel to the direction X in which the plastic films 4 are fed. The narrow slits 60 are spaced from each other in a direction perpendicular to the direction X in which the plastic films 4 are fed. Accordingly, the images of reflecting or permeating lights 61 are remarkably disturbed and changed, as shown in FIG. 16, when the light reflects from or permeates through the minutely rugged surface of heat sealed portion 18 and passes through the narrow slits 60 of cover plate 26 to be directed to the optical sensor 24. The apparatus can therefore read out the minutely rugged surface of heat sealed portion 18 to detect the heat sealed place of plastic films 4.

In the embodiment, each of the narrow slits 60 have the width W of 0.1 to 5.0 mm. The optical sensor 24 is spaced from the plastic films 4 at a distance of about 200 mm. When increasing the distance between the optical sensor 24 and the plastic films 4, it is preferable to increase the width W of each of the narrow slits 60 in proportion to that distance.

Figure 17:
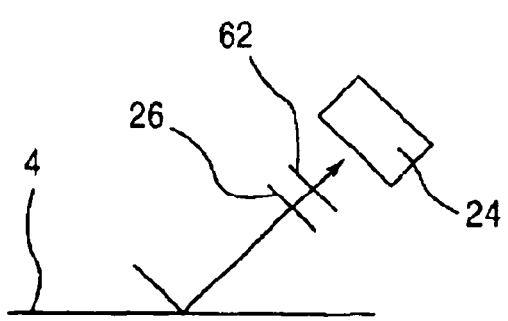
FIG. 17 is a side view of other embodiment.
Figure 18:
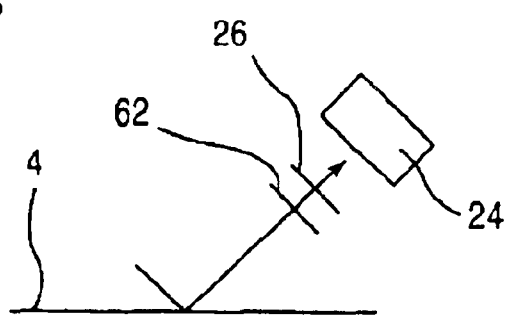
FIG. 18 is a side view of other embodiment.

In each of the embodiments described above, a lens 62 may be disposed between the optical sensor 24 and the cover plate 26 so that the images of reflecting or permeating lights can be made clear by the lens 62, as shown in FIG. 17. The cover plate 26 may be disposed between the optical sensor 24 and the lens 62 so that the images of reflecting or permeating lights can be made clear by the lens 62. A lens may be incorporated into the small holes 28 or the narrow slits 60 of cover plate 26.

What is claimed is:

1. An apparatus for detecting heat sealed places of plastic film means which is fed in a direction, said plastic film means including heat sealed portions formed at the heat sealed places, each of the heat sealed portions having a surface minutely rugged to constitute a pattern such as a mesh, said apparatus comprising:

light source means comprising a plurality of light sources opposed to said plastic film means, said light sources being spaced from each other in directions parallel and perpendicular to the direction in which said plastic film means is fed;

an optical sensor opposed to said plastic film means; and a cover plate disposed between said optical sensor and said plastic film means, said cover plate including small hole or narrow slit means through which light passes, said light source emitting a plurality of lights which reflect from or permeate through said plastic film means and then pass through said small hole or narrow slit means to be directed to said optical sensor, said optical sensor image recognizing the reflecting or permeating lights and reading out the minutely rugged surface of heat sealed portion to detect the heat sealed place of plastic film means in accordance with a variation of image.

2. The apparatus as set forth in claim 1 wherein said small hole or narrow slit means comprises a plurality of small holes or narrow slits formed in said cover plate to be spaced from each other.

3. The apparatus as set forth in claim 2 wherein said small holes or narrow slits are spaced from each other in directions parallel and perpendicular to the direction in which said plastic film means is fed.

4. The apparatus as set forth claim 1 wherein said plastic film means is fed longitudinally thereof and intermittently, said plastic film means being heat sealed widthwise thereof whenever intermittently fed, said optical sensor then detecting the heat sealed place of plastic film means whenever said plastic film means is intermittently fed, a cutter being disposed at a position and moved by position adjustment means to adjust the position of edge of cutter in a direction parallel to the direction in which said plastic film means is fed, in response to a detecting signal transmitted from said optical sensor so that said plastic film means can be cut along a line predetermined at or near the heat sealed portion thereof by said cutter.

5. The apparatus as set forth in claim 1 wherein said plastic film means is fed longitudinally thereof and intermittently for a length, said plastic film means being heat sealed widthwise thereof by seal bar means disposed at a position whenever said plastic film means is intermittently fed, said optical sensor then detecting the heat sealed place of plastic film means whenever said plastic film means is intermittently fed, to adjust the feed length of plastic film means or the position of heat seal bar means in response to a detecting signal transmitted from said optical sensor so that said plastic film means can be cut along a line predetermined at or near the heat sealed portion thereof by a cutter.

6. The apparatus as set forth in claim 1 wherein standing pouches are made from said plastic film means, each of the standing pouches comprising rectangular panel materials which are superposed into two layers to have bottom and opposite side edges, a bottom material being folded into halves, superposed into two layers and interposed between the layers of panel material at the bottom edges thereof, one of said layers of panel material being bottom sealed with one of said layers of bottom material to include a bottom sealed portion formed along the bottom edge of panel material, the other layer of panel material being bottom sealed with the other layer of bottom material to include a bottom sealed portion formed along the bottom edge of panel material, said layers of panel material being cross sealed with each other to include cross sealed portions formed along the opposite side edges of panel material, each of the bottom and cross sealed portions having the minutely rugged surface, said optical sensor reading out the minutely rugged surfaces of bottom and cross sealed portions to judge whether the relation in place between the bottom and cross sealed portions is good or no good, whenever said panel and bottom materials are fed widthwise of the standing pouches and intermittently after being bottom and cross sealed in a standing pouch making process.

7. The apparatus as set forth in claim 6 wherein each of said bottom sealed portions includes unsealed portions formed therein, each of said unsealed portions having a surface which is not or barely minutely rugged, said optical sensor judging whether the relation in place between the bottom and cross sealed portions is good or no good, in accordance with the place of unsealed portion.

8. The apparatus as set forth in claim 6 wherein each of said bottom sealed portions has a bowl-shaped upper edge, said optical sensor judging whether the relation in place between the bottom and cross sealed portions is good or no good, in accordance with the place of bowl-shaped upper edge.

9. The apparatus as set forth in any one of claims 6 to 8 wherein punch holes are formed in said bottom material at intersections between the bottom and cross sealed portions, said layers of panel material being partially sealed with each other at the places of punch holes, said punch holes protruding from the cross sealed portions to have protruding portions formed on the opposite sides of the cross sealed portions, each of the providing portions having a surface which is not or barely minutely rugged, said optical sensor judging whether the relation in place between the punch holes and the bottom and cross sealed portions is good or no good, in accordance with the place of protruding portion.

10. The apparatus as set forth in any one of claims 6 to 9 wherein said cross sealed portions have center lines along which notches are formed into the cross sealed portions from the bottom edges of panel material, said optical sensor judging whether the relation in place between the notches and the bottom and cross sealed portions is good or no good.

11. The apparatus as set forth in claim 1 wherein standing pouches are made from said plastic film means, each of the standing pouches comprising rectangular panel materials which are superposed into two layers to have bottom and opposite side edges, a bottom material being folded into halves, superposed into two layers and interposed between the layers of panel material at the bottom edges thereof, one of said layers of panel material being bottom sealed with one of said layers of bottom material to include a bottom sealed portion formed along the bottom edge of panel material, the other layer of panel material being bottom sealed with the other layer of bottom material to include a bottom sealed portion formed along the bottom edge of panel material, said layers of panel material being cross sealed with each other to include cross sealed portions formed along the opposite side edges of panel material, each of the bottom and cross sealed portions having the minutely rugged surface, said optical sensor reading out the minutely rugged surfaces of bottom and cross sealed portions to judge whether the relation in place between the bottom and cross sealed portions is good or no good, when said standing pouches are fed widthwise thereof after being made.

12. The apparatus as set forth in claim 11 wherein each of said bottom sealed portions includes an unsealed portion formed therein, said unsealed portion having a surface which is not or barely minutely rugged, said optical sensor judging whether the relation in place between the bottom and cross sealed portions is good or no good, in accordance with the place of unsealed portion.

13. The apparatus as set forth in claim 11 wherein each of said bottom sealed portions has a bowl-shaped upper edge, said optical sensor judging whether the relation in place between the bottom and cross sealed portions is good or no good, in accordance with the place of bowl-shaped upper edge.

14. The apparatus as set forth in any one of claims 11 to 13 wherein punch holes are formed in said bottom material at intersections between the bottom and cross sealed portions, said layers of panel material being partially sealed with each other at the places of punch holes, said punch holes protruding from the cross sealed portions to have protruding portions formed on the opposite sides of the cross sealed portions, each of the protruding portions having a surface which is not or barely minutely rugged, said optical sensor judging whether the relation in place between the punch holes and the bottom and cross sealed portions is good or no good, in accordance with the place of protruding portion.

15. The apparatus as set forth in any one of claims 11 to 14 wherein each of said standing pouches are corner cut at corners between the bottom and opposite side edges thereof to give an appearance, said optical sensor judging whether the appearance of corner cutting is good or no good.

16. The apparatus as set forth in claim 1 wherein standing pouches are made from said plastic film means, each of the standing pouches comprising rectangular panel materials which are superposed into two layers to have bottom and opposite side edges, a bottom material being folded into halves, superposed into two layers and interposed between the layers of panel material at the bottom edges thereof, one of said layers of panel material being bottom sealed with one of said layers of bottom material to include a bottom sealed portion formed along the bottom edge of panel material, the other layer of panel material being bottom sealed with the other layer of bottom material to include a bottom sealed portion formed along the bottom edge of panel material, said layers of panel material being cross sealed with each other to include cross sealed portions formed along the opposite side edges of panel material, each of the bottom and cross sealed portions having the minutely rugged surface, said optical sensor reading out the minutely rugged surfaces of cross sealed portions to judge whether the sealed width of cross sealed portion is good or no good, when said standing pouches are fed widthwise thereof after being made.

\* \* \* \* \*